Oct. 25, 1938.  R. D. ELLIOTT  2,134,114
FILTER AND METHOD OF OPERATION
Filed Dec. 26, 1935  2 Sheets-Sheet 1
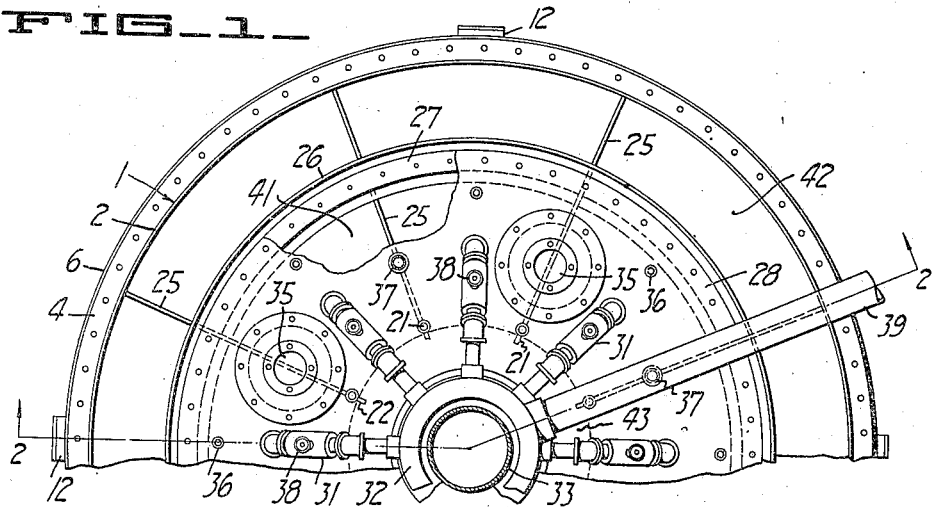
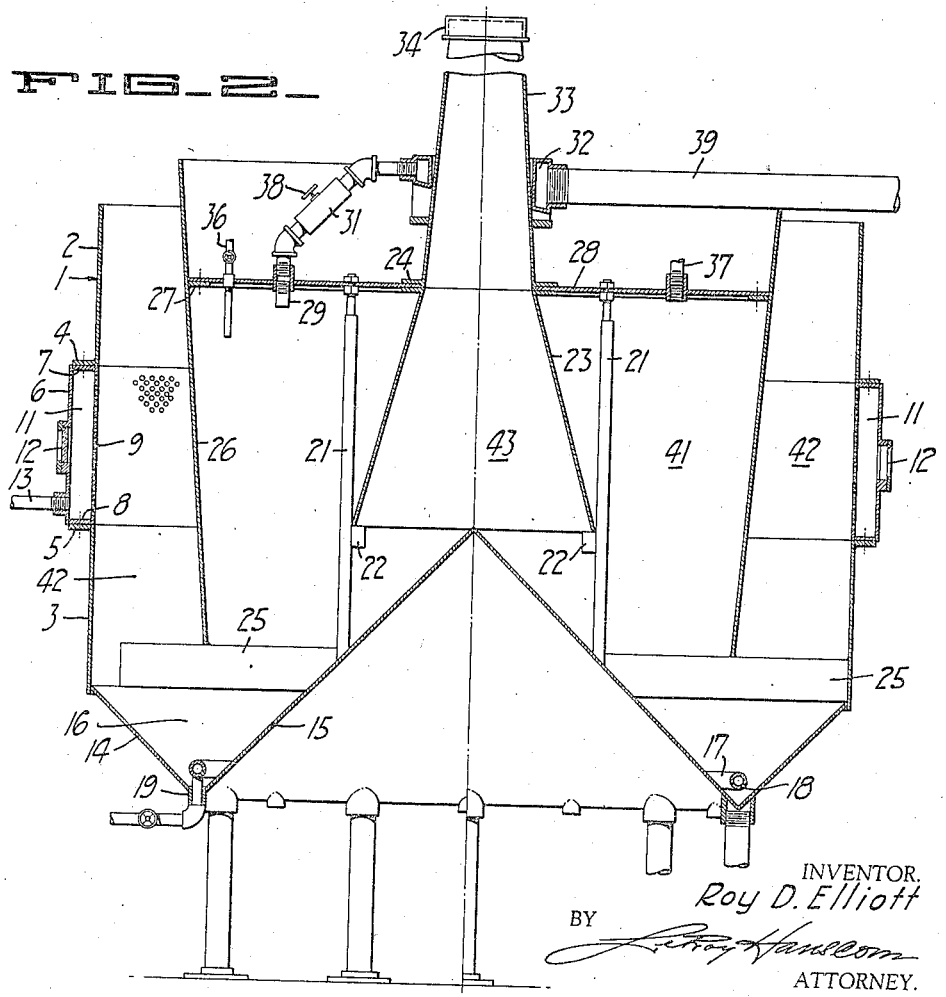
INVENTOR.
Roy D. Elliott
BY
ATTORNEY.

Oct. 25, 1938.   R. D. ELLIOTT   2,134,114
FILTER AND METHOD OF OPERATION
Filed Dec. 26, 1935   2 Sheets-Sheet 2
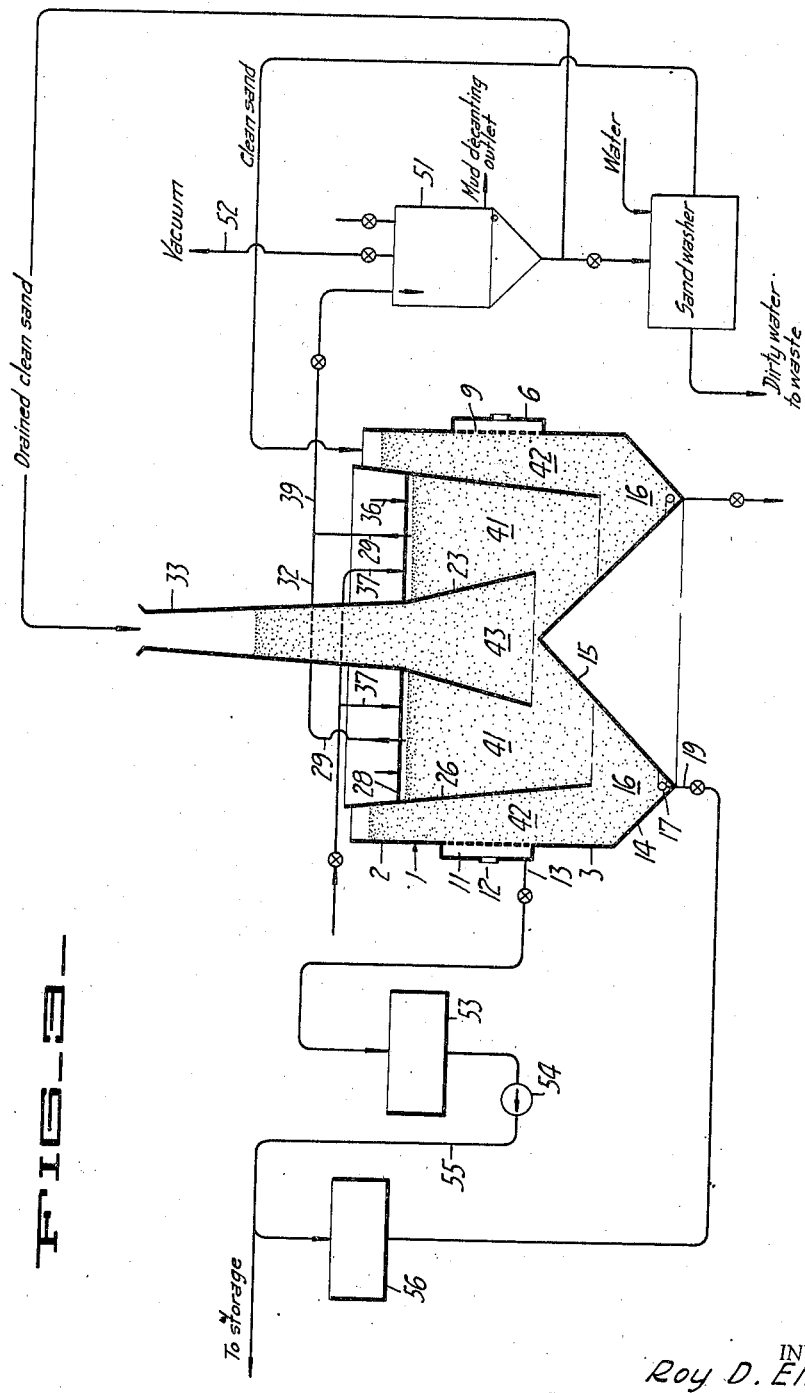

Patented Oct. 25, 1938

2,134,114

UNITED STATES PATENT OFFICE 2,134,114

FILTER AND METHOD OF OPERATION

Roy D. Elliott, Oakland, Calif.

Application December 26, 1935, Serial No. 56,133

9 Claims. (Cl. 210—141)

This invention relates in general to filters, and in particular to sand filters.

One essential of a sand filter is that channeling be avoided. The "liquor lanes" must all be maintained at the uniform size of the sand interstices and in order to maintain this condition the sand must be compacted during filtration. In a down flow sand filter the sand is automatically compacted by the downward progression of the filtrate. In an upflow sand filter channeling has been avoided in the past only by locking the body of sand between two spaced supporting members.

One of the objects of the invention is the provision of means for compacting a body of sand as filtration progresses, and for loosening or expanding said body of sand upon a reversal of the direction of flow of filtrate when the body of sand is being cleaned.

Another object of the invention is the provision of means for introducing clean sand to the central portion of the body of sand thru which filtration takes place.

Still another object of the invention is the provision of means for introducing clean sand to the terminal end of the body of sand thru which filtration progresses.

Another object of the invention is the provision of a filtrant distributing compartment which may be subjected to sub-atmospheric pressures during the cleaning operation of the filter, for the purpose of permitting the free egress of foreign matter from the sand and for displacing the dirty sand with cleaner sand.

Another object of the invention is the provision of a method of operating a sand filter whereby dirty sand and foreign matter is periodically removed from the filter and replaced by cleaner sand.

Another object of the invention is the provision of a method of recovering the soluble values remaining in a sand filter at the end of the filtration cycle, and for washing a body of comminuted or granular matter free of impurities.

The invention possesses other advantageous features, some of which with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is a partial top plan view of a sand filter embodying the objects of my invention.

Figure 2 is a vertical section taken on the line 2—2 of Figure 1.

Figure 3 is a flow diagram disclosing one manner in which my filter may be used.

As shown in Figures 1 and 2 the objects of my invention may be conveniently embodied in a filter of general cylindrical form. The outer cylindrical shell generally designated by the reference numeral 1 comprises upper and lower cylindrical sections 2 and 3 provided with outwardly extending flanges 4 and 5, and an intermediate cylindrical section 6 provided with inwardly extending flanges 7 and 8. These three cylindrical sections may be secured together by either bolting thru the flanges 4, 7, 5, and 8, or by welding as desired. Secured to the inner edges of the flanges 7 and 8 is a perforated cylindrical plate 9 which forms with the central section 6, a filtrate compartment 11, and which is provided with sight glasses 12, and with a filtrate outlet 13. Welded to the lower edge of the cylindrical section 3 is an inclined circular plate 14 which in turn is welded to an inverted cone 15, and forms therewith a circular V-shaped trough 16. Disposed within the lower portion of the trough 16 is a circular pipe 17, provided along its lower edge with perforations 18 and communicating with a fitting 19, extending thru the bottom of the trough 16. The pipe 17 should be maintained slightly spaced from the bottom of the trough 16, and instead of being provided with the perforations 18, it may be provided with slotted nipples the lower ends of which are adapted to engage the bottom of the trough.

Welded to the inverted cone 15 about a circle midway between the ends of the cone are a number of stay bolts 21 provided intermediate their ends with lugs 22 and seated on the lugs 22 is an inverted open ended conical member 23, whose upper end is provided with an outwardly extending flange 24. Extending radially between the lower cylindrical section 3 and the inverted conical member 15 are a number of webs 25, preferably secured in place by welding. The radial ribs support intermediate their ends, an outwardly flaring cylindrical partition 26, provided somewhat below its upper end with an inwardly extending flange 27. Supported by the stay bolts 21 and secured to the flanges 24 and 27 by welding, is an annular plate 28 and extending thru the plate 28 are a number of short nipples 29 communicating through suitable fittings 31, with a manifold 32. Seated on and secured to the annular plate 28 by bolts or welding is an upwardly converging pipe 33 forming an extension of the inverted conical member 23, and provided at its upper end with a removable cap 34. If desired the annular plate 28 may be provided with a number of sight glasses 35.

In order to regulate or equalize the flow thru the fittings 31 they are provided with valves or gates 38 and for the same reason the manifold 32 is made with a cross-sectional area which gradually increases towards the outlet pipe 39.

From the above description it is to be noted that my filter may be considered as formed of a container having an inverted conical bottom provided with suitable stay bolts and ribs by means of which the rest of the structure may be supported. It is also to be noted that the inverted conical member 23 defines with the outwardly flaring cylindrical partition 26 a downwardly converging compartment 41; that the partition 26 defines with the cylindrical shell generally designated by the reference numeral 1, an upwardly converging compartment 42; that the inverted conical member 23 defines a downwardly converging compartment 43; that the compartment 41 communicates at its lower end with the lower end of the compartment 42, and also with the lower end of the downwardly converging compartment 43.

The annular plate 28 is also provided with a number of depending valved pipes 36 adapted to communicate with the atmosphere and also with a number of filtrant intakes 37.

The filter as above described may be used for several different purposes. It may be used as an ordinary filter for separating solids from liquids, or it may be used as a sweetener for recovering the soluble values contained in a body of granular or comminuted material, such as sand or other filter medium, or for washing a body of sand or comminuted material free of soluble impurities. When used for either of these purposes a filter embodying the objects of my invention may be operated or manipulated in several ways. When used as a straight filter it is first filled with water to the level of the apex of the inverted cone 15, and then sand is introduced thru either the compartment 42, the pipe 33 or both, until the sand assumes a level somewhat above the lower end of the conical member 23. When this has been done the vacuum receiver 51 (see Fig. 3) which communicates with the upper part of the compartment 41 by means of the nipples 29, the manifold 32 and the outlet pipe 39, is connected with a source of vacuum by means of the vacuum line 52. By this procedure the upper closed end of the compartment 41 is placed under a sub-atmospheric pressure, and sand from the compartments 42 and 43 is drawn upwardly to the top of compartment 41. During this operation sand is of course introduced into the upper ends of the compartment 42 and the pipe 33 in order to replace the sand which has moved upwardly into the compartment 41. At this point the vacuum may be released, and on so doing it will be found that the level of the sand in the compartment 41 will drop slightly so as to leave a free space above the sand about one-half or three-quarters of an inch in depth. The downwardly converging walls of the compartment 41 cause the sand in this compartment to be compacted as the level of the sand drops. Communication is then established between the filtrate outlet 13 and a tank 53, which in turn communicates thru a pump 54 with a pipe 55 one branch of which goes to storage and another to a tank 56. The bottom of the tank 56 communicates with the bottom of the trough 16 and should be maintained above or on a level with the top of the compartment 41. The filtrant intake 37 may now be placed in communication with a source of filtrant, such as a sugar solution or gold bearing cyanide solution. Preferably the filtrant is introduced to the filter under a positive pressure. The greater portion of the solid content of the solution is retained in the upper strata of sand contained in the compartment 41, and therefore it may be said that in travelling through the lower part of the compartment 41 and upwardly through the compartment 42 the filtrate is merely subjected to a polishing action. The filtrate in passing downwardly and then upwardly through the continuously converging compartments 41 and 42, further compacts the sand or other filter medium used, and thereby prevents the possibility of any channeling from taking place. The polished filtrate passes outwardly through the screen formed by the perforated cylindrical plate 9 into the filtrate compartment 11, and from there is passed to storage and in part to the tank 56. The filtrate passing into the tank 56 is returned to the bottom of the trough 16, and then passes upwardly through the compartment 42 to the filtrate outlet 13. This recirculation of filtrate is required only when organic solutions are being handled, and is desirable for the purpose of preventing fermentation from taking place in the relatively dead body of sand contained in the bottom of the trough 16. As filtration progresses the upper strata of the body of sand contained in the compartment 41 will become clogged to a point where an economical rate of filtration is no longer obtained. Obviously the time at which this condition takes place depends to a large extent upon the solid content of the solutions being handled. But, whenever this condition prevails it becomes necessary to clean the filter which may be done in several ways.

The nipples 29 are placed in communication with the receiver 51 and the receiver is subjected to sub-atmospheric pressure. This causes the liquor entrained in the body of sand contained in the compartment 41 to move upwardly and thereby loosen the upper strata of the body of sand. The filtrate contained in the container 56 is drawn downwardly and displaces the liquor which has moved upwardly through the compartment 41. It is to be noted that in moving upwardly through the compartment 41 the upwardly diverging walls of the compartment permit the sand and sludge to be loosened to a far greater extent than would be possible if the walls of the compartment were vertical. A further loosening and agitation of the sand may be obtained by opening the valves associated with the pipes 36 thereby permitting air under atmospheric pressure to pass downwardly thru these pipes. The sludge or mud which ordinarily is lighter than the sand, together with a small amount of sand is drawn through the nipples 29 into the manifold 32 and passes through the pipe 39 into the receiver 51, in which the mud may be decanted from the sand. The sand which is drawn off from the upper strata of the body of sand contained in the compartment 41 is displaced by sand from the lower strata. Clean sand or sand which has been previously used and separated from its mud content in the receiver 51 by decantation, may be introduced through the pipe 33 to the lower end of the compartment 41. For many purposes previously used sand which has been separated from its mud content may be introduced in this manner without washing. However, if it is desired to use perfectly clean sand it may be obtained by passing the sand contained in the receiver 51 to a sand washer, washing the sand and then conveying the sand so washed to the pipe 33. Clean sand should also be introduced into the upper part of the compartment 42 to replace the sand which has moved downwardly in this compartment during the cleaning operation. The sand introduced at this point should be perfectly clean, for its function is to polish the filtrate which has been substantially freed of all foreign matter during its downward passage through the compartment 41. The sand for this purpose may be obtained from the sand washer or from any other suitable source. In this connection it should be noted that if in cleaning the filter the removable cap 34 is left seated on top of the pipe 33, sand from the compartment 42 will move downwardly to displace the sand moving upwardly through the compartment 41 rather than sand from the pipe 33. In this manner relatively clean sand is made to replace the upper strata of sand which are drawn out of the compartment 41 through the nipples 29 by the action of vacuum. If however the cap 34 is removed from the pipe 33 the upwardly moving sand in the compartment 41 will be displaced by sand from the pipe 33, which ordinarily has been previously used and separated from its mud content, but which has not been subjected to a washing action. In this latter case there appears to be a preference or selective action for the sand contained in the pipe 33 rather than for the sand contained in the compartment 42. Possibly this is due to the fact that a greater head of sand is carried in the pipe 33 than in the compartment 42. After a sufficient quantity of sand has been removed in this manner from the upper strata of the compartment 41 so as to present an efficient filtering surface, the vacuum is cut off and the filtration cycle repeated.

Although the dimensions required in constructing a filter of this character are not critical, it should be borne in mind that sand, depending upon its moisture content, may be regarded either as a solid or as a fluid. Relatively dry sand acts as a solid and has a tendency to bridge over. It has therefore been found that to obtain a free flow of sand downwardly through the pipe 33 the mouth of the pipe should have a diameter of not less than 6 or 8 inches, and the pipe 33 should have an appreciable taper.

It should also be observed that in cleaning the filter the movement of the sand is countercurrent to the direction of flow of the filtrate, and that during the cycle of filtration the filtrate passes through progressively cleaner sand.

Although sand has been referred to as the filter medium the term has been used to designate any granular or comminuted filter medium. In this connection it has been observed that there are many types of sand and that different types act differently with respect to their fluidity, and their filtration properties.

Another use to which the equipment above described may be put is in connection with washing a body of granular or comminuted material free of soluble impurities, or in recovering soluble values entrained in such a body of material. In the normal process of filtration wherein the filtrant is passed through a medium permeable to the passage of liquid and impermeable to the passage of solids, there is produced an accumulation or cake of solids on the entering side of the filter medium. A certain quantity of the liquid remains in the admixture with the accumulated solids and filter medium. Oftentimes it is desirable to recover this liquid. In the sugar industry this process or recovering the soluble values is referred to as "sweetening" and is carried out by forcing a displacing medium such as water through the accumulated mass of sediment until sweetening is complete. In other industries the process is known as "desweetening" or "washing". Sometimes it is the solids which are the valuable constituent, and if the liquids entrained in the solids contain soluble matter which, from a standpoint of the separated solids is considered as an impurity, it is desirable to wash such solids free of these impurities. Whatever the industry or purpose may be the operation is substantially the same. The filtration of sugar solutions and the sweetening of the cake may be selected as typical of this type of operation. The material to be washed consists of filter medium such as sand or diatomaceous earth and mud or sediment containing a certain amount of entrained sugar solution. To prepare the filter for a sweetening operation as above described the lower part of the filter is filled with water to the level of the apex of the inverted cone 15, clean sand is introduced through the compartment 42 and pipe 33 until the sand is slightly above the level of the bottom of the inverted cone 23. Vacuum is then applied to the upper part of the compartment 41 so as to draw clean sand up to the top of this compartment. Sand and sediment to be sweetened is then introduced and maintained in the pipe 33, some of it being drawn up into the compartment 41 to displace the clean sand which is drawn therefrom through the pipe 39 by means of the vacuum. At the end of this operation the pipe 33 and the compartment 41 should be full of sweet sediment and sand, and the compartment 42 should be full of clean sand. The vacuum may then be cut off and hot water introduced to the upwardly presented face of the sweet sediment and sand contained in the compartment 41, by means of the inlet pipes 37. The hot water is forced down through the body of sweet sand and sediment, displacing the sugar solution which passes upwardly through the clean body of sand contained in the compartment 42, and out through the filtrate outlet 13. The flow of water through the filter or sweetener is continued until the top layer of sand and sediment contained in the compartment 41 is free of sugar. At this point the upper strata of the desweetened sand and sediment may be drawn off by vacuum through the nipples 29 into the receiver 51. During this operation the cap 34 is not used and therefore the application of vacuum to the upper end of the compartment 41 not only serves to draw off the desweetened sand and sediment, but also serves to draw sweet sand and sediment from the pipe 33 into the lower end of the compartment 41 to displace the desweetened sand and sediment which has been drawn off. The sediment or mud drawn into the receiver 51 together with the desweetened sand may be separated from the sand by decanting and the sand subjected to a washing operation and returned to the upper end of the compartment 42. In order to prevent dilution of the sugar liquor it is preferable to dry the sand before returning it to the sweetener or filter, and for this purpose any suitable dryer may be used. As a result of continued operation it may be found that the sand contained at the intercommunicating bottoms of the compartments 41 and 42 may become so compacted that the liquor instead of flowing upwardly into the compartment 42 will tend to flow upwardly into the pipe 33.

To overcome this difficulty the cap 34 may be applied to the top of the pipe 33, and a small amount of clean sand from the compartment 42 drawn upwardly into the compartment 41 by means of the application of vacuum to the upper part of the compartment 41 through the nipples 29.

Since the top of compartment 42 is open to atmosphere, the application of a sub-atmospheric pressure to the top of the compartment 41 merely subjects the two extreme ends of the continuous body of sand contained in the compartments 41 and 42 to a differential pressure which causes the body of sand to move toward the lower pressure. The same phenomena may be obtained by subjecting the upper end of compartment 42 to a super-atmospheric pressure and the upper end of the compartment 41 to atmospheric pressure or a sub-atmospheric pressure. In the same manner a movement of sand may be obtained from the compartment 43 to the compartment 41.

Although a filter of cylindrical form has been shown and described the same principles may be utilized in a filter of rectangular or other form.

I claim:

1. A filter comprising: a pair of upwardly converging compartments having open upper ends; a downwardly converging compartment closed at its upper end and communicating at its lower end with the lower ends of said upwardly converging compartments; means for introducing filtrant to the upper end of said downwardly converging compartment and a filtrate outlet associated with one of said upwardly converging compartments.

2. A filter comprising: an upwardly converging compartment having an open upper end; a downwardly converging compartment closed at its upper end and communicating at its lower end with the lower end of said upwardly converging compartment; means for introducing filtrant to the upper end of said downwardly converging compartment; a filtrate outlet associated with said upwardly converging compartment; and means for subjecting the upper end of said downwardly converging compartment to a sub-atmospheric pressure.

3. A filter comprising: a pair of separate upwardly converging compartments having open upper ends; a downwardly converging compartment closed at its upper end and communicating at its lower end with the lower ends of said separate, upwardly converging compartments; and means for subjecting the upper end of said downwardly converging compartment to a sub-atmospheric pressure.

4. A filter comprising: an upwardly extending compartment having an open upper end; a downwardly extending compartment having a closed upper end and communicating at its lower end with the lower end of said upwardly extending compartment; means for introducing filtrant to the upper end of said downwardly extending compartment; a filtrate outlet associated with said upwardly extending compartment and means for subjecting the upper end of said downwardly extending compartment to a sub-atmospheric pressure.

5. A filter comprising: an upwardly converging compartment having an open upper end; a downwardly converging compartment closed at its upper end and communicating at its lower end with the lower end of said upwardly converging compartment; means for introducing filtrant to the upper end of said downwardly converging compartment and a filtrate outlet associated with said upwardly converging compartment; said downwardly converging compartment being filled with a granulated filtering medium to a point slightly below its closed upper end and said upwardly converging compartment being filled with a granulated filtering medium to a point above its filtrate outlet.

6. A filter system comprising: an upwardly extending compartment having an open upper end; a downwardly extending compartment having a closed upper end and communicating at its lower end with the lower end of said upwardly extending compartment; means for introducing filtrant to the upper end of said downwardly extending compartment; a filtrate outlet associated with said upwardly extending compartment, a vacuum receiver communicating with the upper part of said downwardly extending compartment and a source of vacuum communicating with said vacuum receiver.

7. A filter comprising: an upwardly converging compartment; a downwardly converging compartment closed at its upper end and communicating at its lower end with the lower end of said upwardly converging compartment; an inlet communicating with said downwardly converging compartment; a filtrate outlet communicating with said upwardly converging compartment and means associated with the upper end of said downwardly converging compartment whereby said compartment may be subjected to a sub-atmospheric pressure.

8. A filter comprising: an upwardly converging compartment; a downwardly converging compartment having a closed upper end and communicating at its lower end with said upwardly converging compartment; a body of comminuted or granulated filter material supported within said compartments; a filtrant inlet associated with the upper end of said downwardly converging compartment; a filtrate outlet associated with said upwardly converging compartment; a filter medium draw off associated with the upper end of the downwardly converging compartment and means for subjecting the opposite ends of said body of filter material to a differential pressure.

9. In a filter wherein a downwardly extending washing chamber communicates at its lower end with an upwardly extending supply chamber and with an upwardly extending polishing chamber, the method of washing sand or other comminuted material comprising: maintaining a continuous body of the material to be washed in said washing and supply chambers and a body of clean sand in said polishing chamber; passing wash water downwardly through said washing chamber and upwardly through said polishing chamber; periodically moving the sand in said supply chamber downwardly so as to displace sand contained in said washing chamber and removing washed sand from the upper part of said washing chamber.

ROY D. ELLIOTT.